United States Patent [19]

Goettel

[11] Patent Number: 4,491,124

[45] Date of Patent: Jan. 1, 1985

[54] SELF-TAPPING DUCT FITTING

[76] Inventor: Richard J. Goettel, 8133 W. Montebello, Glendale, Ariz. 85303

[21] Appl. No.: 383,558

[22] Filed: Jun. 1, 1982

[51] Int. Cl.³ .............................................. F23L 11/00
[52] U.S. Cl. ................................. 126/293; 29/157 T; 29/513; 285/158; 285/424; 408/204
[58] Field of Search ................. 285/40, 189, 158, 424; 126/292, 293; 29/157 T, 512, 513; 408/1 R, 203.5, 204–206, 703

[56] References Cited

U.S. PATENT DOCUMENTS

| | | |
|---|---|---|
| 3,290,066 | 12/1966 | Primich et al. ................. 285/424 X |
| 3,349,792 | 10/1967 | Larkin . |
| 3,354,808 | 11/1967 | Maccrow . |
| 3,477,745 | 11/1969 | Williams et al. . |
| 3,609,056 | 9/1971 | Hougen . |
| 3,722,499 | 3/1973 | Lukjan ............................ 126/292 |
| 3,726,545 | 4/1973 | Grim et al. ...................... 285/40 X |
| 3,915,477 | 10/1975 | Timmons . |

Primary Examiner—Dave W. Arola
Attorney, Agent, or Firm—Herbert E. Haynes, Jr.

[57] ABSTRACT

A self-tapping duct fitting (10) in the form of a hollow sleeve having an interrupted cutting edge (20) at a one end (14) so that a hole (68) can be cut in a wall (66) of the duct by a rotative motion of the fitting. Preferably, the interrupted cutting edge (20) includes a plurality of teeth (22) which can form tabs bendable against the inner surface (72) of the duct wall (66) once a hole (68) has been cut in order to retain fitting (10) in place.

10 Claims, 12 Drawing Figures

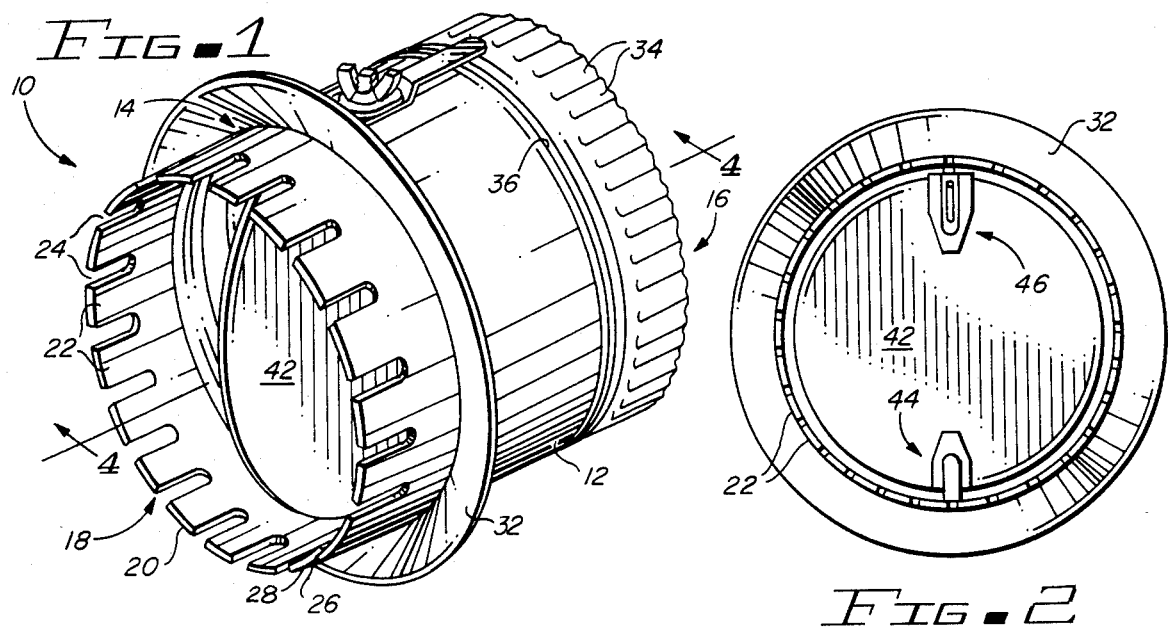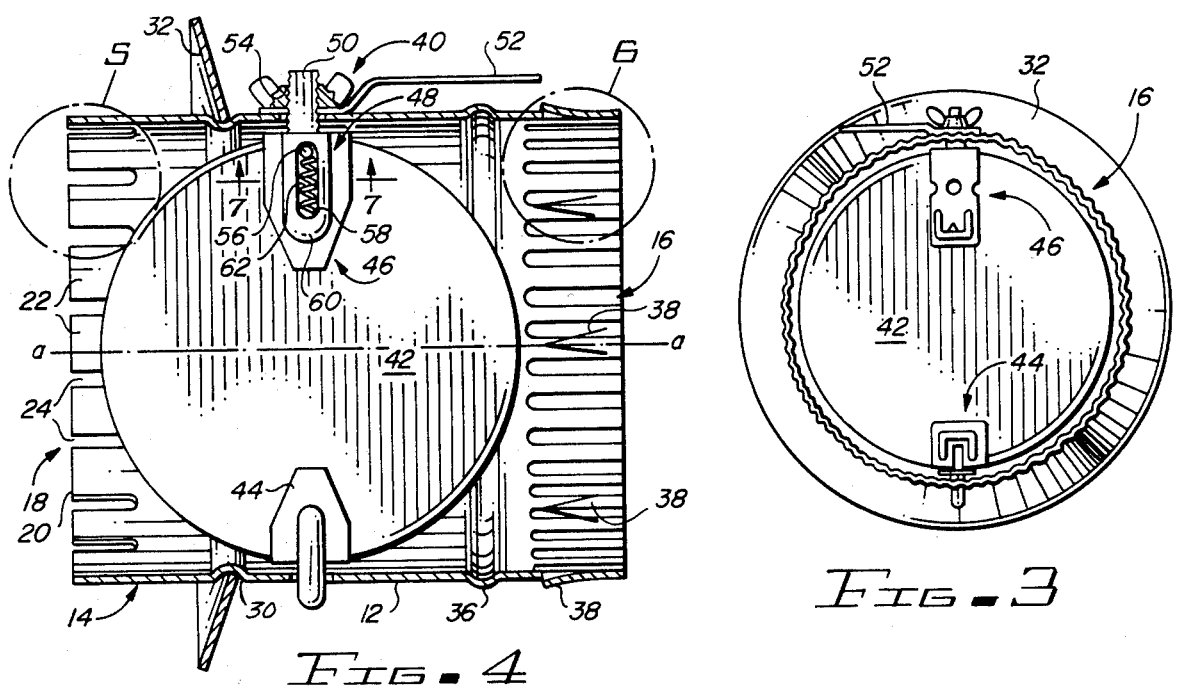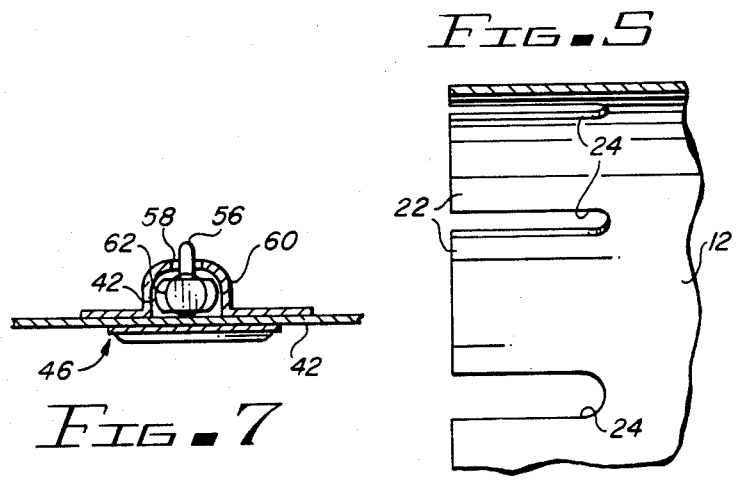

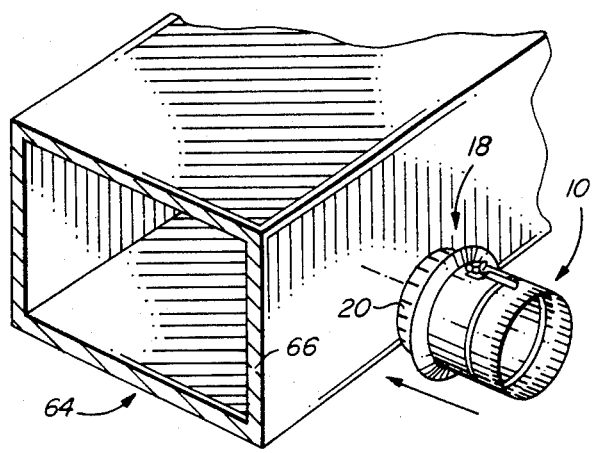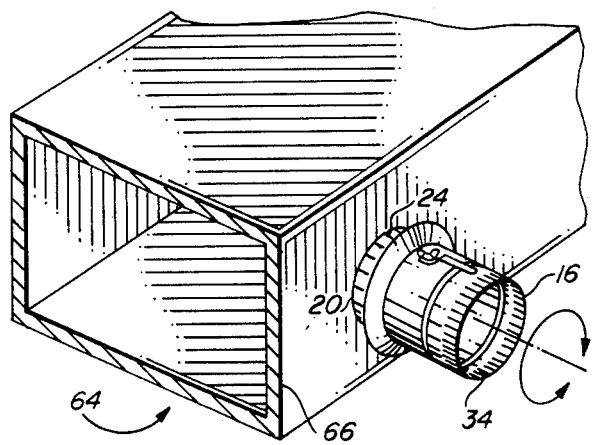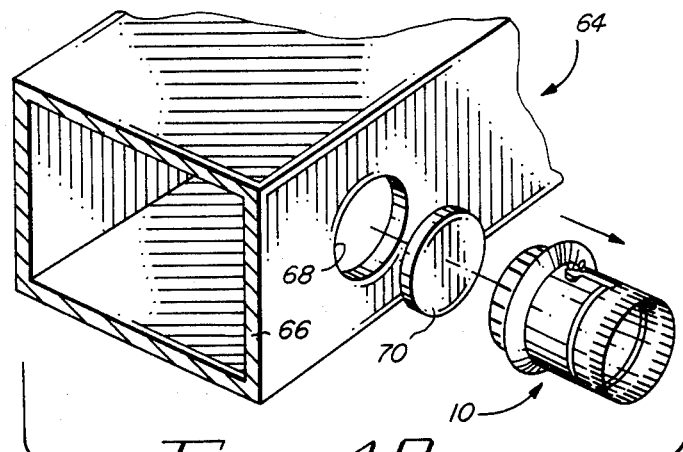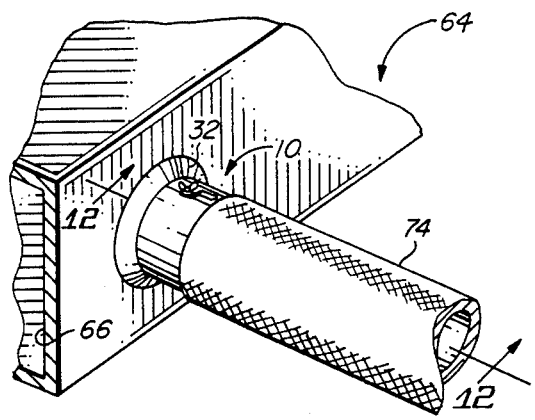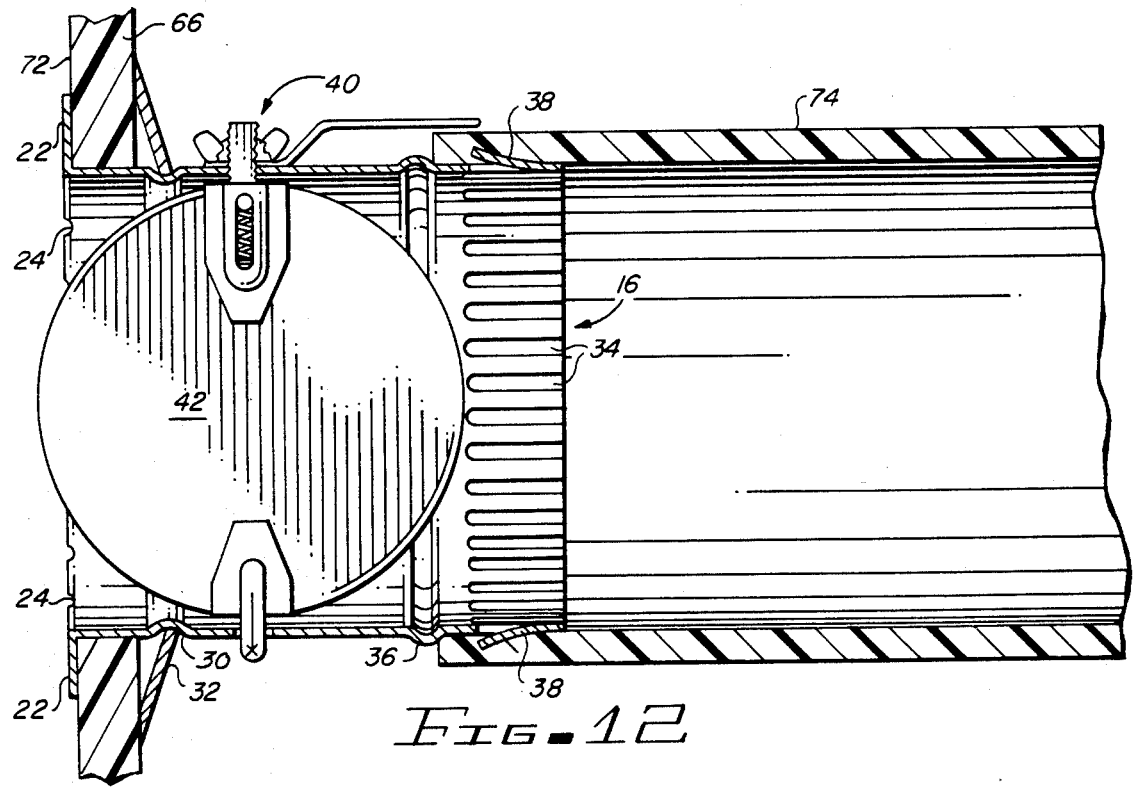

SELF-TAPPING DUCT FITTING

BACKGROUND OF THE INVENTION

1. Field of the Invention

This invention relates generally to ducting as used in air conditioning systems, and more particularly to a self-tapping fitting capable of connecting together such ducting.

2. Description of the Prior Art

It is customary in the heating, cooling and ventilation field to employ a main, or trunk duct, having extending from it one or more branch ducts. Various fittings have been proposed for connecting a branch duct to an associated main duct. One mannner of attaching a fitting to a duct is shown in U.S. Pat. No. 3,290,066, issued Dec. 6, 1966, to T. Primich, et al, wherein a plurality of tabs are bent over in order to secure a fitting on an associated duct. A significant problem, however, is in cutting a hole in the main duct - which may be constructed from a rigid or flexible metal, reinforced fiberglass, rubber, and the like - prior to insertion and attachment of the branch fitting.

U.S. Pat. Nos. 3,349,792 issued Oct. 31, 1967, to M. E. Larkin, and 3,609,056, issued Sept. 28, 1971, to E. D. Hougen, disclose examples of hole cutters which can be used for tapping holes in air conditioning ducting. A basic disadvantage with this approach, however, is that a large number of cutters must be kept available in order to cut a hole sized to a specific fitting. Further, there can be difficulty in inserting a fitting into a hole cut for it, since it is desirable to have a close fit between the fitting and the hole.

Another problem encountered with the installation of branch duct fittings to main ducts of air conditioning systems, and the like, is that there must be found a manner of attaching the fitting to the duct. Other than the use of the aforementioned bent tabs, it is conventional to employ bolts and similar fasteners which result in projection of an end of a bolt, and the like, into the main duct. Such projections generally are undersirable, in as much as they cause turbulence in the fluid stream within the duct.

Accordingly, it has been proposed to provide quick connection arrangements on duct fittings in order to eliminate the attachment problems referred to above, as well as to assure a good fit between the fitting and an associated duct. Examples of such quick connections can be found in U.S. Pat. Nos. 3,477,745, issued Nov. 11, 1969, to J. W. Williams, et al, and 3,915,477, issued Oct. 28, 1975, to D. R. Timmons. These fittings, intended specifically for use with reinforced fiberglass ducts, employ split rings which permit the connector portion of the fitting to be threaded through a hole previously cut in the associated duct. Once threaded through the duct, the split ring or flange retains the fitting in place on the duct.

With the above approach, however, not only is it first necessary to cut a hole in the associated duct, but insertion of the connector into the hole tends to tear the wall adjacent the hole. This also is the case with U.S. Pat. No. 3,726,545, issued Apr. 10, 1973, to J. R. Grim, et al, which discloses an air duct connector especially for use with reinforced fiberglass ducts and in which the leading edge of the connector is provided with cutting teeth for initially forming a circular aperture in the duct wall. Radially extending tabs are provided for being threaded into the hole, or aperture, so cut so as to lock the connector to the duct wall. Besides tearing a disadvantage of this construction is that the cutting teeth extend into the fluid flow path of the main duct so as to cause turbulence therein. Further, in order to remove the cutout portion of the duct wall from the interior of the duct, which portion will also cause turbulence, air flow restriction, noise, and the like, if retained in the duct, must be done carefully through the mounted fitting in order to avoid the projecting cutting teeth, and the like.

U.S. Pat. No. 3,354,808, issued Nov. 28, 1966, to L. Macrow, discloses an air distribution device provided with a damper arrangable blocking one of two fluid discharge grilles.

Poorly fashioned cuts, such as the pre-cutting of holes by free hand use of a knife, razor blade, and the like, as required in using some of the hereinbefore described prior art fittings, and/or sidewall tearing resulting from use of other above discussed prior art fittings, results in shredding of the fiberglass sidewall materials adjacent the cut holes. In addition to such shredded materials becoming a leakage prone weak spot, shredded fibers must be kept out of the air moving in the duct system to prevent the known health hazzard associated with airborne fibers.

SUMMARY OF THE INVENTION

It is an object of the present invention to provide a duct fitting, or connector, which can be mounted in a simpler and more efficient manner than known devices for the same purpose.

It is another object of the present invention to provide a duct fitting, or connector, which combines hole-cutting and attachment functions in a manner which will not tear out the associated duct wall.

Still another object of the present invention is to provide a simple yet effective manner of cutting a hole in a duct wall on which a fitting is to be mounted.

It is yet another object of the present invention to provide a manner of attachment of a duct fitting to a main, or trunk, duct which will be fairly close to an inner surface of the duct wall and avoid projections and protuberances into the air flow path of the duct.

These and other objects are achieved according to the present invention by providing a self-tapping duct fitting having a hollow sleeve forming a pair of open ends and defining an axis extending between the open ends. A tapping arrangement is disposed in a one of the open ends of the hollow sleeve for cutting a hole in a wall of an associated duct when the sleeve is rotated about the axis extending between the ends of the sleeve. Advantageously, the sleeve is substantially cylindrical in configuration, and the one of the ends is annular.

The tapping arrangement may include the one of the ends arranged forming an interrupted edge, and preferably comprises a plurality of teeth spaced from one another a distance forming a slot between adjacent teeth. After a hole has been cut in a duct on which the associated fitting is to be mounted, the teeth can be bent against an inner surface of the wall of the duct in which the hole has been cut so as to retain the sleeve on the associated duct board.

A damper can be pivotally mounted in the sleeve and arranged for selectively being extendible past the one of the ends of the sleeve for deflecting a fluid flow in an associated duct into the sleeve of a fitting according to the present invention.

An advantage of the present invention is that a hole can be cut in the wall of a fluid-flow duct, and the like, by pressing an annular interrupted edge of a sleeve of a fitting being mounted in the hole against a wall of a duct in which the hole is to be cut. By rotating the interrupted edge pressed against the duct wall or board, a clean, i.e., non-shredded, circular hole will be cut through the wall of the associated duct for closely and contiguously circumscribing the fitting mounted therein.

It is another advantage of the present invention that the interrupted edge of the sleeve can be formed by uniformly spaced teeth provided along the interrupted edge of the fitting.

Still another advantage of the present invention is that after a hole is cut in a duct wall on which a fitting according to the invention is to be mounted, the fitting can be removed together with the circular cut-out piece of the wall, the piece removed from the fitting, and the fitting reinserted into the hole now formed in the duct without any shredding or other disturbing of the materials circumscribing the cut hole and the plurality of closely spaced teeth previously used for cutting the hole can be bent over against an inner surface of the wall so as to retain the sleeve in place on the duct and effectively shield the cut hole to maintain the integrity thereof.

The foregoing and other objects of this invention, as well as the invention itself, may be more fully understood from the following description when read in conjunction with the accompanying drawings.

BRIEF DESCRIPTION OF THE DRAWINGS

FIG. 1 is a perspective view showing a self-tapping duct according to the present invention.

FIG. 2 is an end elevational view looking from the left in FIG. 1.

FIG. 3 is an end elevational view looking from the right in FIG. 1.

FIG. 4 is an enlarged, sectional view taken generally along the line 4—4 of FIG. 1.

FIG. 5 is an enlarged, detail view showing the circled area designated "5" in FIG. 4.

FIG. 6 is an enlarged, detail view showing the circled area designated "6" in FIG. 4.

FIG. 7 is an enlarged, fragmentary, sectional view taken generally along the line 7—7 of FIG. 4.

FIGS. 8, 9, 10, and 11 are fragmentary, perspective, diagrammatic views illustrating an intended use of a fitting according to the present invention.

FIG. 12 is an enlarged, fragmentary, sectional view taken generally along the line 12—12 of FIG. 11 and showing a fitting according to the present invention mounted on a duct board and connected to a flexible air duct.

DESCRIPTION OF THE PREFERRED EMBODIMENTS

Referring now more particularly to FIGS. 1 through 4 of the drawings, a self-tapping duct fitting 10 comprises a hollow sleeve 12 formed from a thin sheet of a deformable self-supporting material, such as a steel or aluminum, and forming a pair of open ends 14 and 16 defining between them an axis a—a. Arranged at end 14 of sleeve 12 is a tapping arrangement 18 capable of cutting a hole into a wall of an associated duct when the sleeve is rotated about the axis a—a of sleeve 12.

Sleeve 12 is substantially cylindrical in configuration, with the ends 14 and 16 being annular or circular, and tapping arrangement 18 including end 14 forming an interrupted edge 20 preferably comprising a plurality of teeth 22 spaced from one another a distance forming slots 24, as can best be seen in FIG. 5. A tooth 26 can be slightly wider than the teeth 22 and be partially formed by an overlapping portion 28 along a seam of sleeve 12 formed when a single sheet of flexible material as discussed above is curved into a cylindrical form.

Teeth 22 are usually about ¾ of the distance of one of the teeth 22 and an adjacent one of the slots 24. It has been found satisfactory using 28 or 30 gauge galvanized steel to have teeth 22 about 0.75 inch along edge 20, with the spacing formed by slots 24 being about 0.2 inch, for a total distance of approximately 0.85 inch. Tooth 26 as discussed above was in this instance 1.1 inch, with there being about 22 teeth 22, 26 in all on a sleeve 12 diameter of about 6 inches.

A groove 30 is provided circumferentially of sleeve 12 adjacent end 14 thereof in order to retainingly receive a frustoconical shield 32 arranged for sealingly abutting a duct wall in which fitting 10 is mounted, as will be described below. Shield 32 can be formed as by being cut in a known manner from a flat sheet of material and curved into groove 30 and fastened together in a suitable, known manner (not shown).

End 16 of sleeve 12 has formed therein about the periphery thereof corrugations 34, for a purpose to become clear below, and extending from an annular bead 36 formed in the part of end 16 of sleeve 12 in which corrugations 34 are provided, are a plurality of points 38 (FIG. 6) generally in the form of an isosceles triangle with the base being integral with sleeve 12 and the apex thereof directed toward bead 36. The purpose of points 38 will become clear below. For a 6" diameter sleeve 12, 5 points 38 have been used.

A damper 40 of conventional construction is advantageously disposed within sleeve 12 both to selectively partially or fully block the flow path through sleeve 12, and to selectively extend into the flow path of a duct associated with a fitting 12 provided with a damper 40. (See FIG. 12).

Damper 40 includes a generally planar, circular baffle 42 having provided thereon a pair of pintle assemblies 44 and 46. The latter has slidably mounted an element 48 including a shaft 50 of rectangular or square cross section and receiving in keyed relationship a handle or crank 52 retained in place by a wingnut 54 threadingly engaged with screw threads provided on shaft 50. Extending from shaft 50 is a portion of element 48 provided with a transversely extending pin 56 arrangable for sliding movement in a slot 58 defined in a housing 60, as perhaps best seen in FIG. 7. A conventional coil compression spring, and the like, 62, normally biases pin 56 in the upward direction looking at FIG. 4, but permits shaft 50 of element 48, as well as pin 56, to be pushed downwardly as desired in order to install and remove damper 40 from sleeve 12. More specifically, depression of shaft 50 will permit damper 40 to be installed into and removed from holes provided in sidewalls of sleeve 12 for receiving pintle assemblies 44 and 46.

Referring now more particularly to FIGS. 8 through 11 of the drawings, a conventional duct 64 of rectangular cross section and constructed from reinforced fiberglass, sheet metal, and the like, includes a wall 66 in which a fitting 10 according to the present invention is to be mounted. Once the proper position for mounting fitting 10 has been determined, edge 20 of sleeve 12 can be placed in abutting relation to wall 6 and turned left and right until the duct board has been penetrated completely. This step, like all of the steps to be described, should be done with the aid of gloves (not shown), and the like. Once a hole 68 has been cut in wall 66 by the motion as described above and illustrated diagrammatically in FIG. 9, a piece 70 cut out to form a hole 68 in wall 66 is removed by withdrawal of fitting 10 in a direction of the arrow in FIG. 10. While piece 70 is shown separated from fitting 10 in FIG. 10, it is to be understood that piece 70 will be withdrawn with fitting 10 and subsequently manually removed in a manner not shown. Further, while it is possible to push piece 70 out into the interior of duct 64, such is not advisable in as much as it interferes with fluid flow through the duct, causing noise and other undesirable conditions.

After cutout piece 70 has been removed from a fitting 10 to be mounted, the latter can be reinserted into hole 68 until shield 32 sealingly engages with an outer surface of wall 66, as seen in FIG. 11. Now, teeth 22, 26 can be folded over against the inner surface 72 of wall 66, as seen in FIG. 12, in order to secure fitting 10 to wall 66 of duct 64, again making sure that shield 32 is secure against the outer surface of wall 66. Fitting 10 is now mounted on duct 64, and can be connected to a further duct, such as a conventional flexible air duct 74. While such a flexible duct can take many forms, that illustrated can be, for example, a double laminated, polyester hose encapsulating a steel wire helix and complying with the requirements of NFPA 90A and FHA Minimum Property Standards. In particular, flexible duct 74 could be a UL 181 Class I Air Duct Connector such as marketed by ATCO in their 600 Series.

Duct 74 as described above can be fitted on end 16 of sleeve 12 over corrugations 34 and retained in place by the aforementioned points 38. This engagement can best be seen in FIG. 12. It is to be understood that other forms of ducting can be employed, such as those having an inner liner, and attachment by the use of points 38 can be enhanced by use of suitable duct tape (not shown) and the like.

As can be readily understood from the above description and from the drawings, a self-tapping duct fitting according to the present invention permits installation of branch ducts in a simple, efficient, yet convenient manner. No additional tools need even be used to install a fitting according to the present invention. While a specific example was set forth above based on a fitting 6 inches in diameter, is to be understood that the diameter of a fitting can vary as desired. For example, it is contemplated that fittings according to the present invention be provided in sizes of 1 inch intervals from 5 inches to 10 inches, and in two inch intervals from 10 inches to 20 inches. Nevertheless, even this size range is not considered limiting, in as much as the relationship set forth above for the 6 inch diameter fitting can be varied over a wide range of fitting diameters. Further, although a specific embodiment has been described above as including a damper, it is to be understood that fittings according to the present invention can be fabricated with or without dampers as desired.

While the principles of the invention have now been made clear in an illustrated embodiment, there will be immediately obvious to those skilled in the art, many modifications of structure, arrangements, proportions, the elements, materials, and components used in the practice of the invention, and otherwise, which are particularly adapted for specific environments and operations requirements without departing from those principles. The appended claims are therefore intended to cover and embrace any such modifications within the limits only of the true spirit and scope of the invention.

What I claim is:

1. A self-tapping duct fitting, comprising, in combination:
   (a) a cylindrical hollow sleeve forming a pair of open ends and defining an axis extending between the ends;
   (b) tapping and mounting means at a one of the open ends of said sleeve for cutting a hole into a wall for an associated duct when said sleeve is rotated about the axis defined by said sleeve and for mounting of said sleeve in the cut hole, said tapping and mounting means including a plurality of alternately arranged teeth and separating slots formed axially in said sleeve in substantially equally spaced radial increments about the one of the open ends of said sleeve with each of said slots being narrower than each of said teeth;
   (c) a shield circumscribingly mounted on said sleeve in axially spaced relationship with said tapping and mounting means for sealingly engaging the exterior surface of the wall of the associated duct upon mounting of said sleeve in the hole cut by said tapping and mounting means; and
   (d) said sleeve formed of a relatively thin gage deformable metal to provide each of said plurality of teeth with cutting edges and to allow said teeth to be bent over into bearing engagement with the interior surface of the wall of associated duct upon mounting of said sleeve in the hole cut by said tapping and mounting means.

2. A fitting as defined in claim 1, further including a damper pivotally mounted in said sleeve and arranged for selectively being extendible into the one of the ends of the ends of the sleeve for deflecting fluid from the duct into the sleeve.

3. A self-tapping cut fitting as claimed in claim 1 wherein each of said plurality of teeth has an extending edge and a pair of spaced apart side edges which are parallel with respect to each other.

4. A self-tapping duct fitting as claimed in claim 1 wherein each of said plurality of teeth has a width dimension which is about ¾ of the distance of one of said teeth and one of the slots.

5. A self-tapping duct fitting as claimed in claim 1 wherein each of said plurality of slots has a width dimension which is approximately ⅓ of the width dimension of one of said plurality of teeth.

6. A self-tapping duct fitting as claimed in claim 1 and further comprising:
   (a) said sleeve having an annular groove formed therein proximate said tapping and mounting means; and
   (b) said shield being of frusto-conical configuration having an upper base which lies in the annular groove formed in said sleeve and having a lower base which is spaced from the upper base toward said tapping and mounting means.

7. A self-tapping duct fitting as claimed in claim 1 wherein said sleeve is axially corrugated about its periphery adjacent the opposite one of the pair of open ends thereof for axially slidably receiving an open end of a second associated duct.

8. A self-tapping duct fitting as claimed in claim 1 wherein said sleeve is provided with at least a pair of radially upset point means provided proximate the opposite one of the pair of open ends of said sleeve for receiving an end of a second associated duct which is axially slidably mountable on the opposite end of said sleeve.

9. A self-tapping duct fitting as claimed in claim 8 wherein each of said point means is in the form of an isosceles triangle having a base which is integral with said sleeve and an apex which faces away from the opposite end of said sleeve.

10. A method of cutting a hole in a wall of a fluid duct and mounting a duct fitting therein comprising the steps of:

(a) forming a cylindrical hollow duct fitting with an annular interrupted open end edge including an alternately arranged plurality of teeth separated by relatively narrow slots and with an annular shield in spaced relationship with the annular interrupted edge;

(b) pressing the annular interrupted edge of said duct fitting against a wall of a fluid duct in which said duct fitting is to be mounted;

(c) rotating said duct fitting about its longitudinal axis so that the interrupted edge thereof cuts a hole through the wall of the fluid duct;

(d) removing said duct fitting from the cut hole in the wall of the fluid duct to extract the cutout piece therefrom;

(e) pushing the extracted cutout piece out of the open end of said duct fitting;

(f) reinstalling the interrupted open end edge of said duct fitting in the hole cut in step c to bring the annular shield of said duct fitting into sealed bearing engagement with the exterior of the wall of the fluid duct; and (g) bending the teeth of the interrupted edge of said duct fitting into bearing engagement with the interior of the wall of the fluid duct.

* * * * *